US008272622B2

(12) United States Patent
Caldwell

(10) Patent No.: US 8,272,622 B2
(45) Date of Patent: Sep. 25, 2012

(54) ELECTROMAGNETIC ACTUATOR

(75) Inventor: Niall James Caldwell, Edinburgh (GB)

(73) Assignee: Artemis Intelligent Power Limited, Scotland (GB)

( * ) Notice: Subject to any disclaimer, the term of this patent is extended or adjusted under 35 U.S.C. 154(b) by 899 days.

(21) Appl. No.: 12/296,183

(22) PCT Filed: Apr. 3, 2007

(86) PCT No.: PCT/GB2007/001280
§ 371 (c)(1), (2), (4) Date: Feb. 10, 2009

(87) PCT Pub. No.: WO2007/128977
PCT Pub. Date: Nov. 15, 2007

(65) Prior Publication Data

US 2009/0302251 A1 Dec. 10, 2009

(30) Foreign Application Priority Data

Apr. 7, 2006 (GB) .................................. 0607072.6

(51) Int. Cl.
*F16K 31/02* (2006.01)

(52) U.S. Cl. ................ 251/129.15; 251/129.01; 251/65; 335/183; 335/234; 335/236

(58) Field of Classification Search ............. 251/129.01, 251/129.15, 65; 335/103, 183, 220, 229, 335/234, 236
See application file for complete search history.

(56) References Cited

U.S. PATENT DOCUMENTS

| | | | | |
|---|---|---|---|---|
| 3,514,674 | A | 5/1970 | Toshio et al. | |
| 4,295,111 | A | 10/1981 | Wang et al. | |
| 4,403,765 | A * | 9/1983 | Fisher | 251/65 |
| 5,034,714 | A | 7/1991 | Bratkowski et al. | |
| 5,111,779 | A | 5/1992 | Kawamura | |
| 7,156,057 | B2 * | 1/2007 | Lecrivain et al. | 251/129.01 |
| 2006/0071748 | A1 | 4/2006 | Nelson | |

FOREIGN PATENT DOCUMENTS

| | | |
|---|---|---|
| EP | 0170894 | 2/1986 |
| EP | 1507271 | 2/2005 |
| EP | 1788591 | 5/2007 |
| GB | 1237706 | 6/1971 |
| GB | 2285179 | 6/1995 |
| WO | 2006028126 | 3/2006 |

* cited by examiner

*Primary Examiner* — Steven J Ganey
(74) *Attorney, Agent, or Firm* — Stephen H. Eland; Dann, Dorfman, Herrell & Skillman

(57) ABSTRACT

An electromagnetic actuator comprises a core (1), a ferromagnetic component (2) movable in a gap (5) in the core, and a magnet (4) for attracting the component to one side of the gap. A flux concentrator (12) concentrates the magnetic flux on that side of the gap (5) and a solenoid (8) produces magnetic flux in the gap. A magnetic circuit of the solenoid is defined by part of the core (1), part of the gap (5) and by a further gap (6) between the ferromagnetic component (2) and the core (1). A demagnetiser (7) has a magnetic circuit defined by another part of the core (1), another part of the gap (5) and by the further gap (6). The demagnetiser is arranged to demagnetise the magnet (4) at least to the extent that the magnetic flux produced by the solenoid (8) is diverted from the flux concentrator (12) into the further gap (6) and the movable component (2) is movable away from the magnet (4) under the magnetic force of the solenoid (8).

12 Claims, 6 Drawing Sheets

ELECTROMAGNETIC ACTUATOR

PRIORITY APPLICATIONS

This application is a 371 application of International Application No. PCT/GB2007/001280 filed Apr. 3, 2007, which claims priority to United Kingdom Patent Application No. 0607072.6 filed Apr. 7, 2006. Each of the foregoing applications is hereby incorporated herein by reference.

BACKGROUND TO THE INVENTION

This invention relates to a solenoid actuator useful for application to hydraulic valves and to a valve arrangement incorporating such an actuator.

Fluid power systems often rely upon solenoid-actuated valves to control the flow of fluid. It is often advantageous to be able to switch fluid from one path to another as fast as possible, such that the time spent in intermediate positions is minimised, hence minimising energy losses caused by pressure drops though the valve.

Often such valves are constructed as single acting solenoids, whereby a ferromagnetic sliding member such as a spool or a poppet is attracted to an end face of a solenoid, the return flux being passed into the ferromagnetic member in a direction transverse to the axis of the solenoid, such that flux flowing in the circuit produces a net axial force on the moving member which moves it from one position to another. Usually the solenoid cannot produce a force acting in the opposite sense so this force is provided by a spring or some component of the fluid pressure. Such valves often have transit times in the direction of actuation of the order of 40 ms.

Hydraulic/pneumatic pumps and motors are referred to herein as "fluid-working machines". A new class of such machines is emerging in which the commutation of the working chambers is provided not by mechanical means such as port plates, but by solenoid-actuated valves controlled by a digital computer. This technique allows such a machine to displace fluid in discrete units, and the applicant's machines are therefore termed "Digital Displacement™". Operators of these pumps wish to drive them directly from the shafts of industrial diesel engines, which run in the range 1800-2800 rpm. In order to achieve these speeds the commutating valves must actuate many times each second. Actuation time should be kept below 5 ms for accurate commutation.

Solenoid valves according to the prior art cannot achieve this speed of actuation. Usually there is a restoring force to keep the armature in the original position, which is the default position if the coil is inactive. Before the armature moves, the coil must be charged with current, which, because of the high inductance of the coil, takes many milliseconds—this is termed the latency of the coil. Force builds on the armature gradually, until it exceeds this restoring force and causes acceleration of the armature towards the second position. The initial acceleration is low as the force builds gradually, due to the long time constant of the coil. These effects cause a long valve transition time.

Because the period during which the armature is in motion is long, and the latency of the coil is long, there is much uncertainty about the exact time when the valve reaches its actuated position.

SUMMARY OF THE INVENTION

The present invention solves the aforementioned problems and allows a solenoid valve that is fast enough for accurate commutation of a reciprocating fluid volume at the speed of a diesel engine. In addition it has wider application wherever valves need to be actuated quickly, or indeed as a fast direct solenoid actuator outside of the domain of fluid valves.

The invention provides an electromagnetic actuator according to claim 1. The actuator comprises a core, a ferromagnetic component ("the armature") movable in a gap in said core, a magnet for attracting said component to one side of said gap ("the latch gap"), a flux concentrator for concentrating the magnetic flux on said one side of the gap, a solenoid for producing magnetic flux in said gap, a magnetic circuit of said solenoid being defined by part of said core, part of said gap and by a further gap ("the radial gap") between the ferromagnetic component and the core, and a demagnetiser having a magnetic circuit defined by another part of said core, another part of said gap and by said further gap, the demagnetiser being arranged to demagnetise the magnet at least to the extent that the magnetic flux produced by the solenoid is diverted from said flux concentrator into said further gap and said movable component is movable away from the magnet under the magnetic force of the solenoid.

In a particular embodiment, the demagnetiser comprises a coil having a lower latency than the latency of the solenoid.

The actuator may include an electronic driver circuit arranged to provide voltage pulses to the solenoid and the coil such that each of the solenoid and the coil produce magnetic flux in the same direction in an overlapping part of each magnetic circuit. Additionally, a digital controller may be arranged to send signals to the drive circuit such that the solenoid is energised in advance of a time at which the actuator is desired to act, and the coil is energised after the solenoid. Alternatively, the digital controller may be arranged to send a signal to the drive circuit such that the solenoid is energised in advance of a time at which the actuator may be desired to act, the coil then being energised only in response to a decision to actuate the actuator.

The flux concentrator may comprise a taper of the magnet or of an adjacent ferromagnetic element in a direction towards the solenoid.

The actuator may be functionally symmetrical about an axis. Alternatively the actuator may be functionally symmetrical about a plane and comprise at least two cores and two magnets, one of each side of the plane.

The invention further provides a valve arrangement for a fluid-working machine, comprising a valve member attached to the movable ferromagnetic component of the actuator defined above.

Finally the invention provides a fluid-working machine including such a valve arrangement, fluid flow into or from or both into and from one or more working chamber(s) of the machine being controlled to some degree by the valve actuation. The digital controller may be synchronized to a rotating shaft of the machine.

BRIEF DESCRIPTION OF THE DRAWINGS

Particular embodiments of the invention will be described below, by way of example only, with reference to the accompanying drawings, in which.

DETAILED DESCRIPTION OF PARTICULAR EMBODIMENTS

Figure 1:
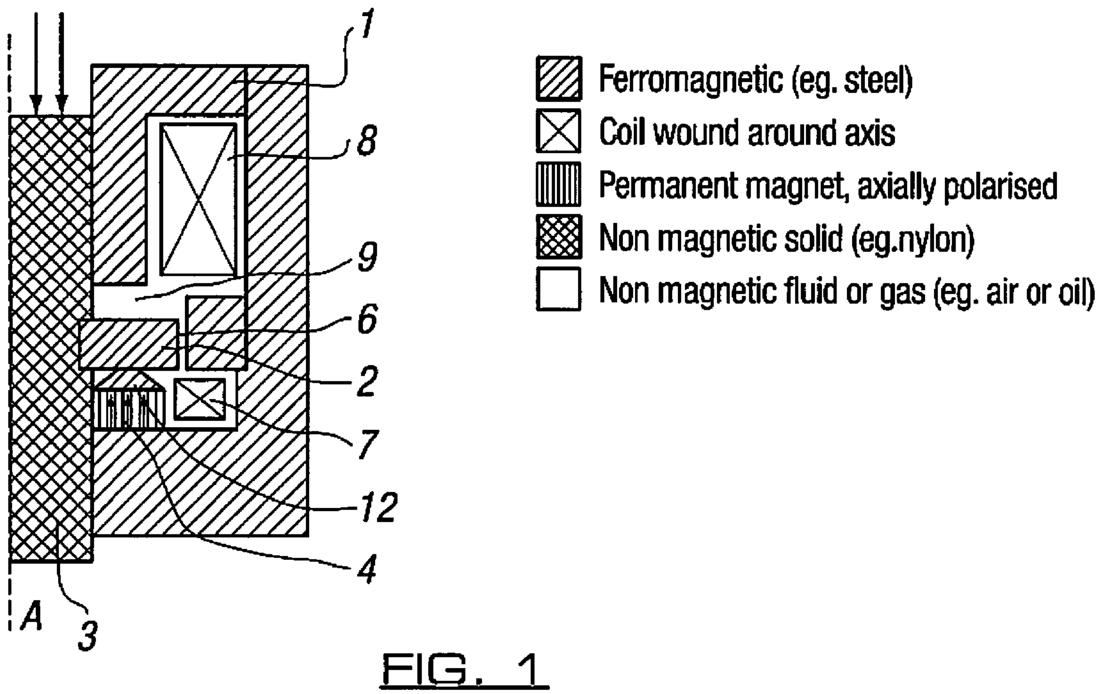
FIG. 1 is a schematic view of an actuator according to the invention.

The actuator of FIG. 1 is symmetrical about an axis A and comprises a core 1 of steel or other ferromagnetic material and which may be formed from a plurality of components. A moving ferromagnetic component ("armature") 2 is attached via a sliding non-magnetic body 3 to the valve spool or poppet or other element to be actuated.

A first magnetic circuit incorporates part of the core 1, a permanent magnet 4, an "axial" air gap 5 ("latch gap", shown in FIG. 2), a "radial" air gap 6, and a first coil ("trigger coil") 7.

A second magnetic circuit incorporates part of the core 1, a second coil ("main coil") 8 forming the solenoid, and an axial air gap ("main gap") 9, and shares the radial air gap 6 with the first magnetic circuit.

The actuator holds the armature 2 in the position as shown in FIG. 1 by means of the permanent magnet 4. Flux from this magnet is concentrated to increase the holding force by means of a flux concentrating geometric feature 12 (preferably a taper as shown in the figure). The armature is passively held in this position by magnetic force, in spite of any loads imposed on the body 3 from the valve (i.e. due to flow through the valve).

Figure 7:
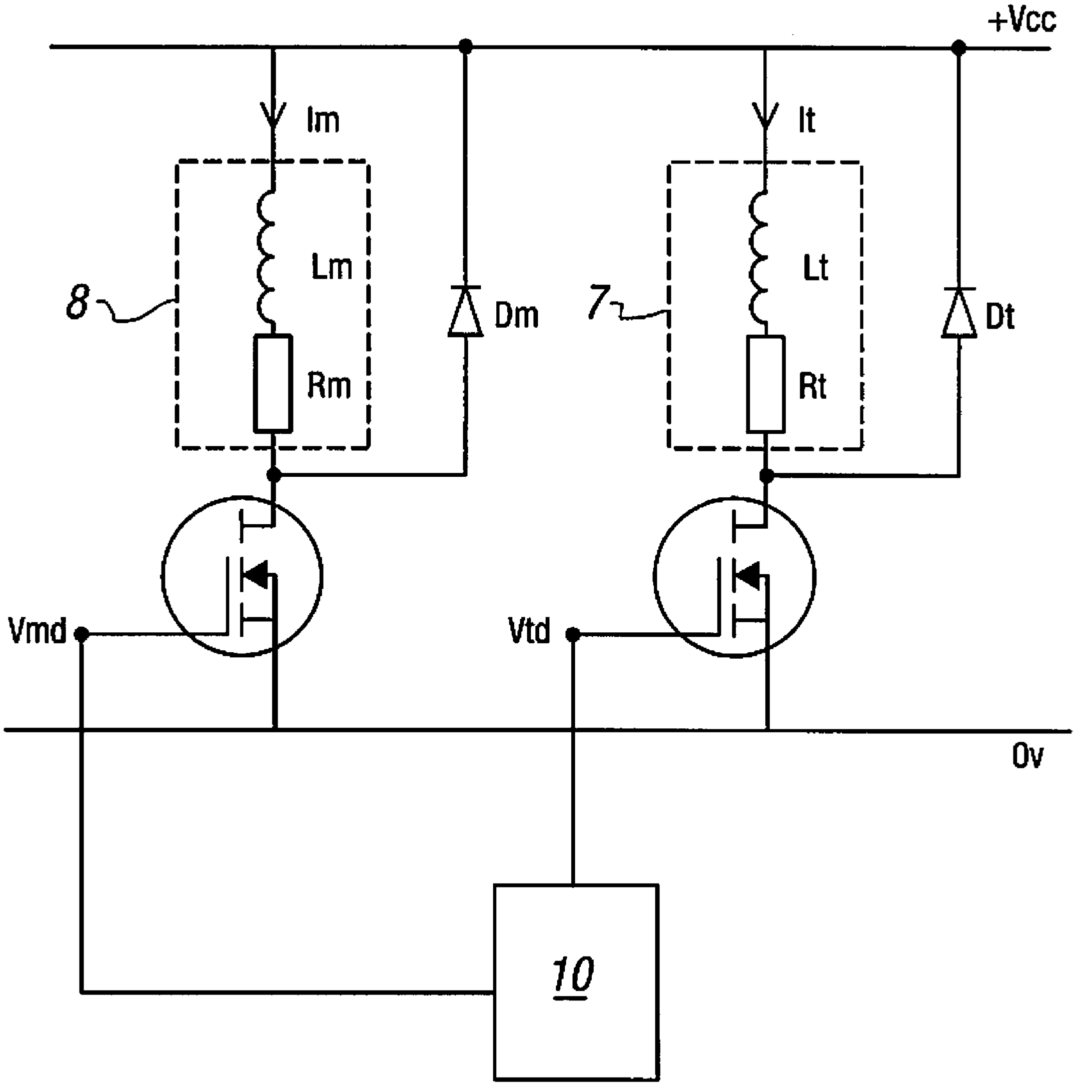
FIG. 7 shows a drive circuit for the actuator of the invention.

The actuator includes an electronic driver circuit capable of sending voltage pulses to the coils, such as is shown in FIG. 7. The polarity of each connection is selected such that the flux induced by the main 8 and trigger 7 coils is of the same direction in the radial gap 6, and such that the trigger coil acts to demagnetise the permanent magnet 4.

A digital controller 10 sends signals to the electronic driver circuit such as to actuate the valve at the correct time, possibly synchronized with the shaft of a rotating machine having one or more reciprocating chambers, fluid flow into or from or both into and from said chamber(s) being controlled to some degree by the valve actuation.

Figure 2:
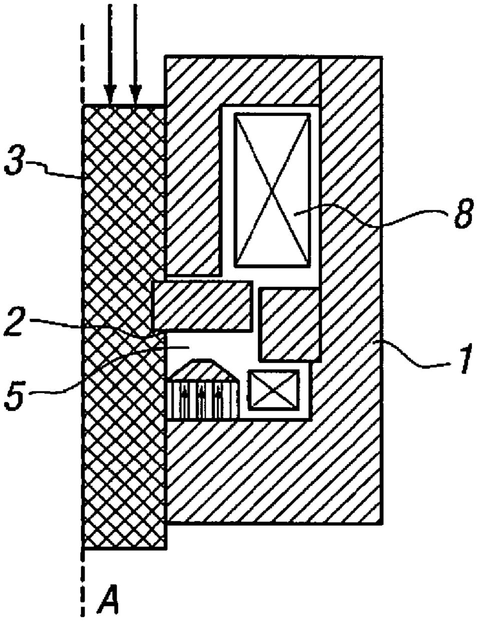
FIG. 2 shows the actuator of FIG. 1 in a different configuration.

The sequence of operation of the controller when it needs to move the valve from the position of FIGS. 1 and 3 to that of FIG. 2 is as follows:

Some time before the valve actuation is or may be required a voltage pulse is sent to the main coil driver, causing the driver to apply a voltage across the solenoid coil 8, such that current increases in the coil according to the time constant of the coil.

Figure 3:
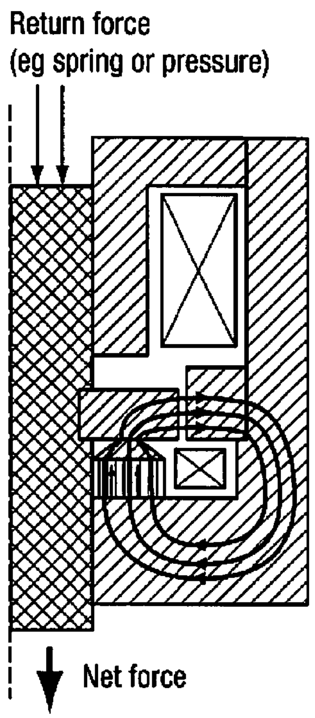
FIG. 3 shows the actuator in a non-energized condition.
Figure 4:
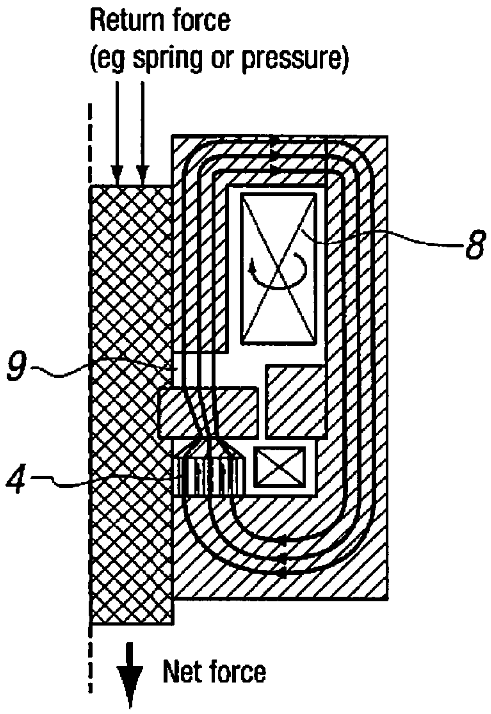
FIG. 4 shows the actuator with its solenoid coil energized.

As the current increases the flux pattern in the actuator changes from that of FIG. 3 to that of FIG. 4. In this condition the flux has built up in the main gap 9, however there is still a net force on the armature 2 from the magnet 4, which acts to keep the armature in the position of FIGS. 1 and 3, because flux which crosses the main gap 9 does so diffusely (at low flux density), whereas flux which crosses the latch gap 5 is concentrated (at high flux density). The basis for this principle is the equation of magnetic attraction:

$$F=B^2A/2\mu_0$$

where F is the force resulting; B is the flux density in the air gap; A is the area normal to the flux direction; $\mu_0$ is the permeability of free space.

According to this equation, if the same amount of flux passes through two air gaps, one of which has half the area of the other, the force produced in the smaller area is double that produced in the larger area.

In this way, the large main coil can be "charged up" without removing the force on the armature acting to keep it in position A.

Just before the valve is due to be actuated, a decision can be taken whether the valve needs to be actuated or not. If not, then the main coil 8 can be de-energised and no actuation takes place.

Figure 5:
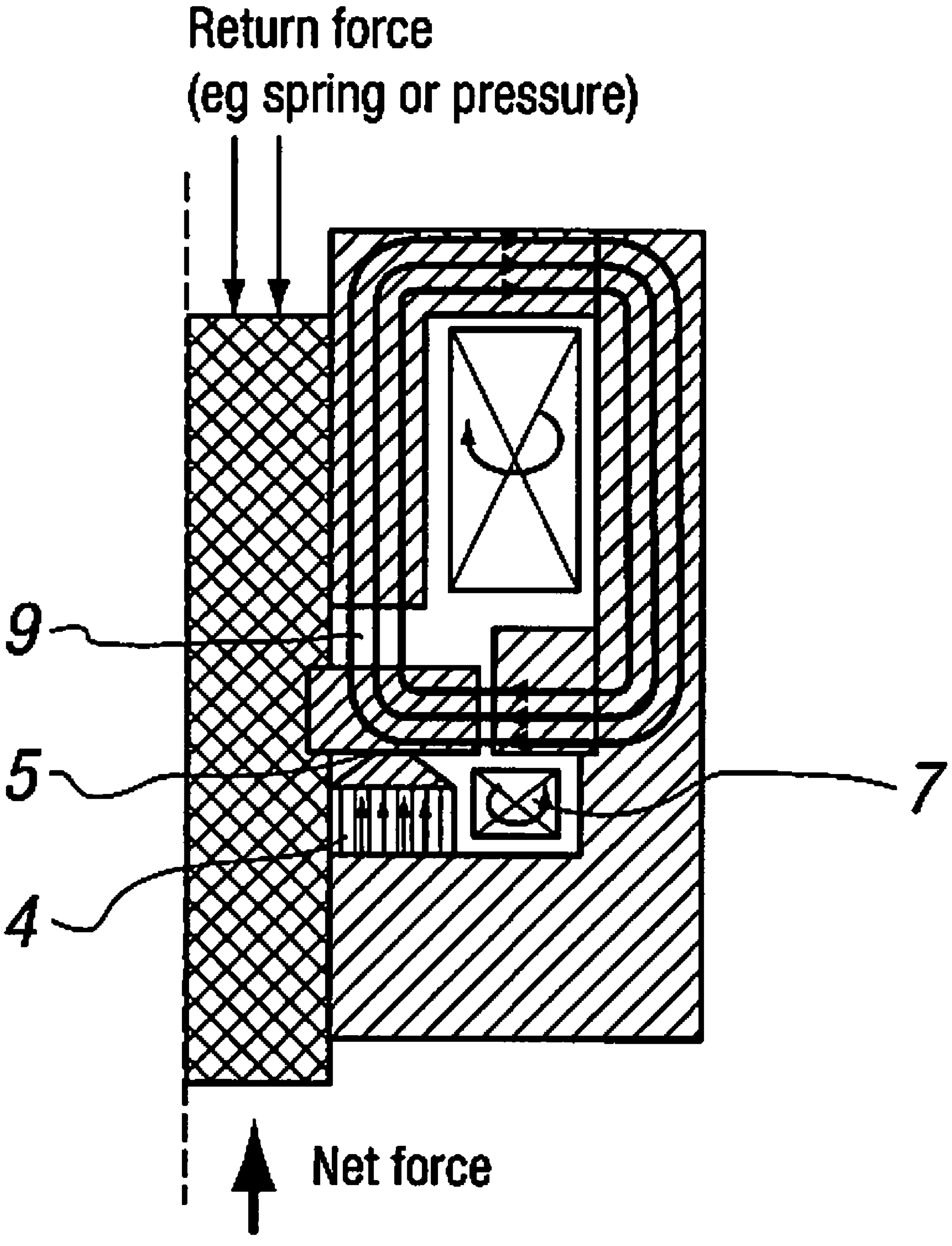
FIG. 5 shows the actuator with both coils energized.
Figure 6:
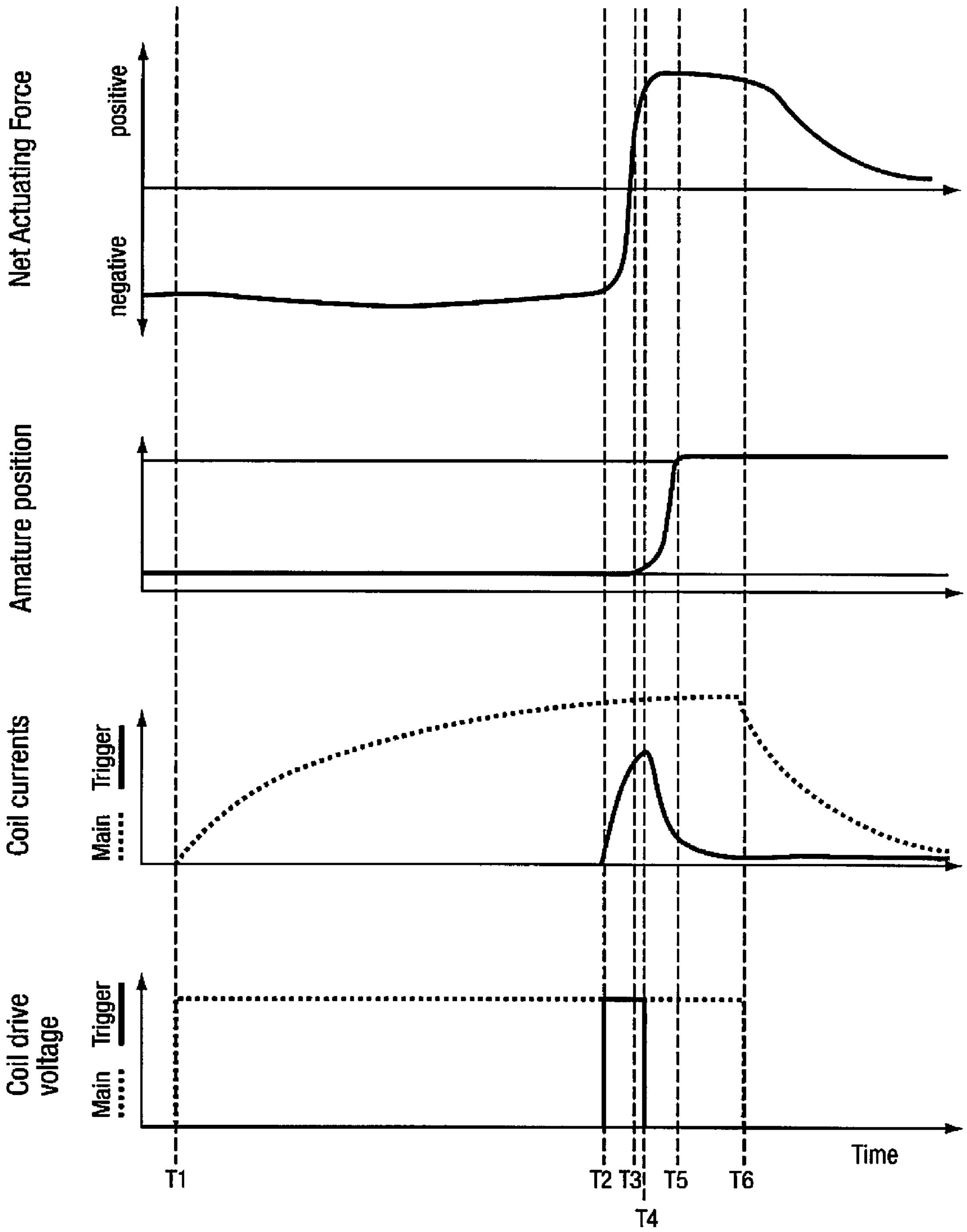
FIG. 6 comprises timing diagrams for the voltages, currents, armature position and net force during normal operation of the actuator.

If actuation is desired, then the trigger coil 7 is energised. Because it has a shorter time constant than the main coil, the current in the trigger coil rises very rapidly, demagnetising the permanent magnet 4 of the latch as it does so. As shown in FIG. 5, the flux in the latch gap 5 is very rapidly eliminated, yet the flux in the main gap 9 is left substantially unaffected. This very rapidly reverses the force balance on the armature 2, which is accelerated towards the position shown in FIG. 2.

Compared with the prior art, the latency is much reduced because the trigger coil 7 has a small time constant. The very rapid build-up of the force means that the time for the armature to transit from the position of FIG. 1 to that of FIG. 2 is short. Together, these improvements mean that the time at which the valve will have fully transitioned is more accurately known than for the prior art.

Once the armature is in the position of FIG. 2, it may be desired to hold it in this position. In the case of application to the poppet valve of a Digital Displacement™ machine, such holding is provided by fluid pressure upon the poppet. However application to other types of valve may require that actuation force be created to hold the armature in the position of FIG. 2. This can be achieved by means of the controller sending high frequency pulses to the main coil 8 (i.e. at a frequency substantially greater than the reciprocal of the time constant of the coil) such that a small holding current in the main coil induces enough flux in the first magnetic circuit to hold the armature in the position of FIG. 2 against whatever return actuation means are present. These means are indicated by the arrows at the top of FIGS. 1 to 5 and may consist of a spring and/or a fluid pressure.

When it is desired that the armature return to the position of FIG. 1, any pulses to the main coil 8 cease, causing the actuation force from the solenoid to reduce until the return force overcomes it and returns the armature to the position of FIG. 1. To increase the speed of this event, it is advantageous to provide the electronic driver for the main coil with provision to reduce the current in the main coil very quickly, such as by introducing a semiconductor switch in series with the diode Dm, the opening of which will cause the current to decay more quickly than if it were closed.

Figure 8:
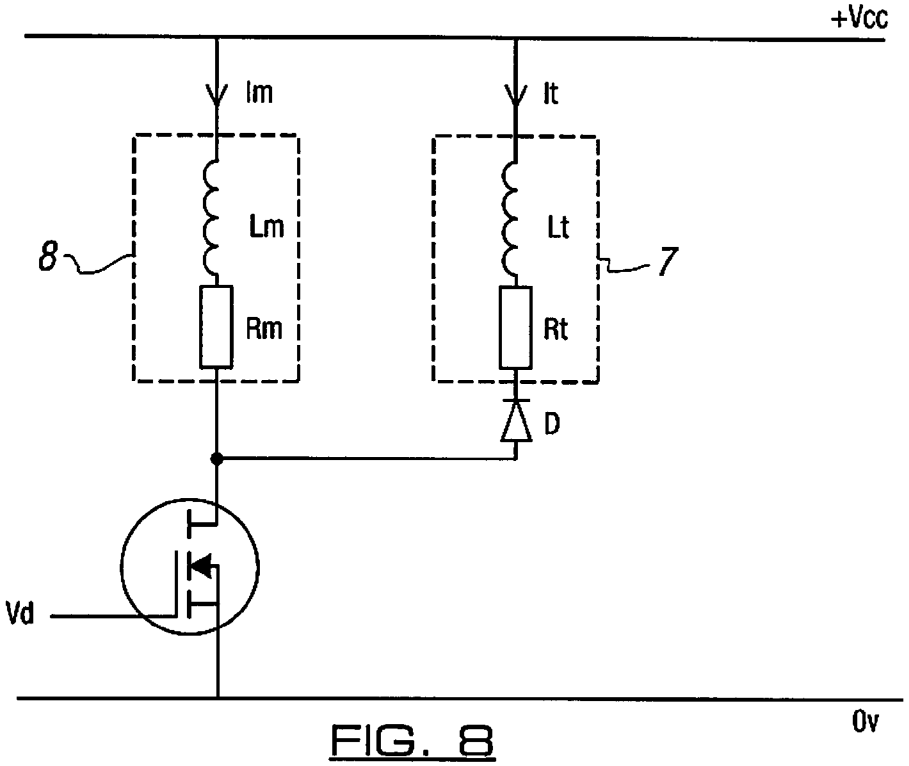
FIG. 8 shows an alternative drive circuit.

In some cases it may be advantageous to reduce the cost of the actuator by reducing the complexity of the electronic drive circuit. In that case the circuit of FIG. 8 may be employed, whereby the trigger coil 7 is placed in series with the diode D, such that when the main coil 8 is de-energised, a voltage is created which causes current to flow in the trigger coil. By careful matching of the coil parameters and the breakdown voltage of the semiconductor switch, it is possible to ensure that there is a period during which there is current in both the main coil 8 and the trigger coil 7, causing actuation to take place.

Figure 9:
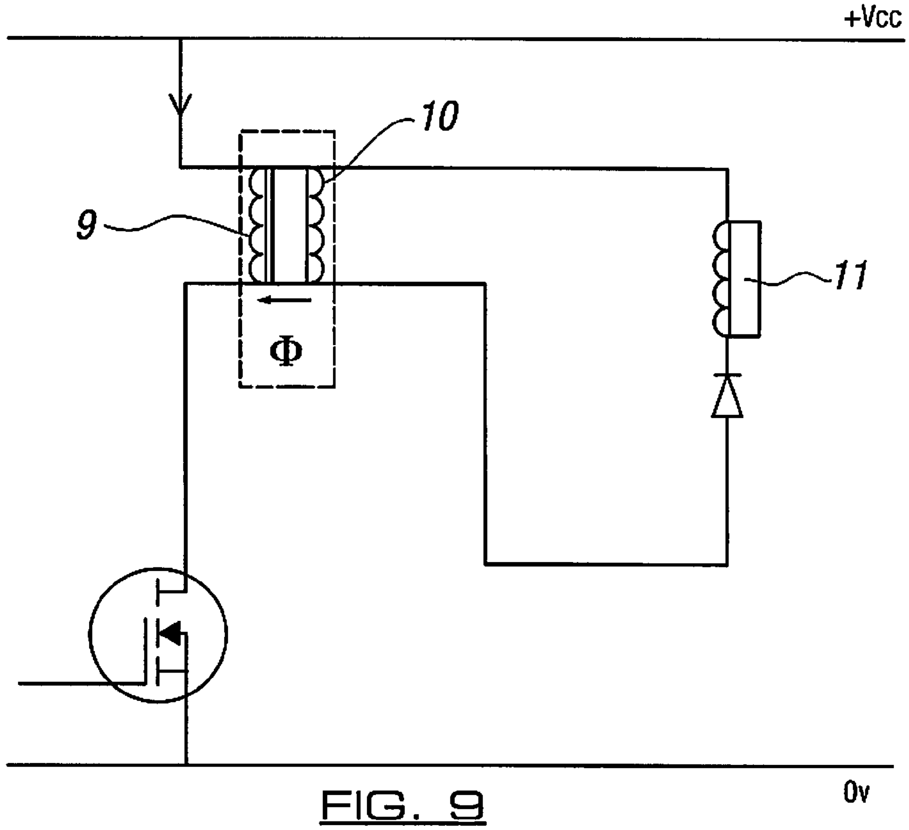
FIG. 9 shows another alternative drive circuit.

An alternative method of realising the same aim as is shown in FIG. 9. The main coil 9 is driven by the electronic driver. Inside the same magnetic circuit as the main coil is placed a third coil 10 ("exciter coil") such that flux which flows through the magnetic circuit of the main coil also flows through the magnetic circuit of the exciter coil. The main and exciter coils are therefore in a transformer arrangement whereby positive rate-of-change of current in the main coil will induce a positive voltage across the exciter coil, while a negative rate-of-change of the main coil current will induce a negative voltage across the exciter coil. The trigger coil 11 is in series with the exciter coil. Thus when the main coil is de-energised, a current is induced in the trigger coil which can be arranged to demagnetise the permanent magnet and cause actuation to take place, given proper choice of both polarity and the number of turns of wire in the exciter and trigger coils. Introducing a diode in series with the trigger coil, as shown, prevents energising of the main coil from inducing a negative current in the trigger coil—which otherwise would increase the rise time of the main coil because of the mutual inductance.

The invention claimed is:

1. An electromagnetic actuator comprising a core, a ferromagnetic component movable in a gap in said core, a permanent magnet for attracting said component to one side of said gap, a solenoid for producing magnetic flux in said gap, a magnetic circuit of said solenoid being defined by part of said core, part of said gap and by a further gap between the ferromagnetic component and the core, and a demagnetiser having a magnetic circuit defined by another part of said core, another part of said gap and by said further gap, the demagnetiser being arranged to demagnetise the permanent magnet at least to the extent that the magnetic flux produced by the solenoid is diverted from said gap into said further gap and said movable component is movable away from the magnet under the magnetic force of the solenoid, a flux concentrator being arranged to concentrate the magnetic flux on said one side of the gap, and to maintain a net force, opposed to the force produced by the energised solenoid, keeping the ferromagnetic component on said one side of the gap.

2. An actuator according to claim 1, wherein the demagnetiser comprises a coil having a lower latency than the latency of the solenoid.

3. An actuator according to claim 2, comprising an exciter coil arranged in the magnetic circuit of the solenoid, the exciter coil being connected in series with the demagnetiser coil.

4. An actuator according to claim 2, wherein the flux concentrator comprises a taper of the magnet or of an adjacent ferromagnetic element in a direction towards the solenoid.

5. An actuator according to claim 2, being substantially symmetrical about an axis.

6. An actuator according to claim 1, including an electronic drive circuit arranged to provide voltage pulses to the solenoid and the coil such that each of the solenoid and the coil produce magnetic flux in the same direction in an overlapping part of each magnetic circuit.

7. An actuator according to claim 6, wherein a digital controller is arranged to send signals to the drive circuit such that the solenoid is energised in advance of a time at which the actuator is desired to act, and the coil is energised after the solenoid.

8. An actuator according to claim 6, wherein a digital controller is arranged to send a signal to the drive circuit such that the solenoid is energised in advance of a time at which the actuator may be desired to act, the coil then being energised only in response to a decision to actuate the actuator.

9. An actuator according to claims 1, being substantially symmetrical about a plane and comprising at least two cores and two magnets, one of each side of the plane.

10. A valve arrangement for a fluid-working machine, comprising:

an electromagnetic actuator comprising: a core; a ferromagnetic component movable in a gap in said core; a permanent magnet for attracting said component to one side of said gap; a solenoid for producing magnetic flux in said gap; a magnetic circuit of said solenoid being defined by part of said core, part of said gap and by a further gap between the ferromagnetic component and the core, and a demagnetiser having a magnetic circuit defined by another part of said core, another part of said gap and by said further gap, the demagnetiser being arranged to demagnetise the permanent magnet at least to the extent that the magnetic flux produced by the solenoid is diverted from said gap into said further gap and said movable component is movable away from the magnet under the magnetic force of the solenoid, and a flux concentrator being arranged to concentrate the magnetic flux on said one side of the gap, and to maintain a net force, opposed to the force produced by the energised solenoid, keeping the ferromagnetic component on said one side of the gap; and a valve member attached to the movable ferromagnetic component of the actuator.

11. A fluid-working machine in which fluid flow into or from or both into and from one or more working chamber(s) of the machine is controlled to some degree by the valve arrangement, comprising:

an electromagnetic actuator comprising: a core; a ferromagnetic component movable in a gap in said core; a permanent magnet for attracting said component to one side of said gap; a solenoid for producing magnetic flux in said gap; a magnetic circuit of said solenoid being defined by part of said core, part of said gap and by a further gap between the ferromagnetic component and the core, and a demagnetiser having a magnetic circuit defined by another part of said core, another part of said gap and by said further gap, the demagnetiser being arranged to demagnetise the permanent magnet at least to the extent that the magnetic flux produced by the solenoid is diverted from said gap into said further gap and said movable component is movable away from the magnet under the magnetic force of the solenoid, and a flux concentrator being arranged to concentrate the magnetic flux on said one side of the gap, and to maintain a net force, opposed to the force produced by the energised solenoid, keeping the ferromagnetic component on said one side of the gap; and a valve member attached to the movable ferromagnetic component of the actuator.

12. A fluid working machine according to claim 11, comprising a rotating shaft, wherein the actuator of the valve arrangement comprises an electronic drive circuit arranged to provide voltage pulses to the solenoid and the coil such that each of the solenoid and the coil produce magnetic flux in the same direction in an over lapping part of each magnetic circuit, wherein a digital controller is arranged to send a signal to the drive circuit such that the solenoid is energised in advance of a time at which the actuator may be desired to act, the coil then being energised only in response to a decision to actuate the actuator and wherein the digital controller is synchronized to the rotating shaft of the machine.

* * * * *